United States Patent
Hiregoudar et al.

(10) Patent No.: US 12,045,485 B2
(45) Date of Patent: *Jul. 23, 2024

(54) OPTIMAL METHOD FOR DELETING SUB-BLOCKS OF A POINTER BLOCK THAT DO NOT HAVE ON-DISK METADATA HEADERS FOR ADDRESSES

(71) Applicant: VMware, Inc., Palo Alto, CA (US)

(72) Inventors: Mahesh Hiregoudar, Bangalore (IN); Prasanna Aithal, Bangalore (IN); Prasad Rao Jangam, Palo Alto, CA (US); Srinivasa Shantharam, Bangalore (IN); Rohan Pasalkar, Palo Alto, CA (US); Srikanth Mahabalarao, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,732

(22) Filed: Nov. 21, 2022

(65) Prior Publication Data

US 2023/0089300 A1   Mar. 23, 2023

Related U.S. Application Data

(63) Continuation of application No. 17/399,098, filed on Aug. 11, 2021, now Pat. No. 11,531,481.

(30) Foreign Application Priority Data

Jun. 23, 2021   (IN) .............................. 202141028254

(51) Int. Cl.
   *G06F 3/06*   (2006.01)

(52) U.S. Cl.
   CPC .............. *G06F 3/064* (2013.01); *G06F 3/061* (2013.01); *G06F 3/0631* (2013.01); *G06F 3/067* (2013.01)

(58) Field of Classification Search
   CPC ........ G06F 3/064; G06F 3/061; G06F 3/0631; G06F 3/067
   USPC .................................................. 711/154, 156
   See application file for complete search history.

(56) References Cited

U.S. PATENT DOCUMENTS

| | | | |
|---|---|---|---|
| 10,809,932 B1 | 10/2020 | Armangau et al. | |
| 11,531,481 B1* | 12/2022 | Hiregoudar | ............ G06F 3/064 |
| 2003/0158873 A1 | 8/2003 | Sawdon et al. | |
| 2003/0159007 A1 | 8/2003 | Sawdon et al. | |
| 2007/0136510 A1* | 6/2007 | Ippongi | ............... G06F 12/0246 |
| | | | 711/E12.008 |

(Continued)

*Primary Examiner* — Than Nguyen
(74) *Attorney, Agent, or Firm* — Kim & Stewart LLP

(57) ABSTRACT

A method of deleting a first pointer block of a plurality of pointer blocks of a file system from a storage device used by a plurality of applications, wherein the plurality of pointer blocks are each subdivided into sub-blocks, includes the steps of: determining that a first sub-block of the first pointer block is marked as being empty of any addresses of the file system at which storage space is allocated to files of the applications; determining that a second sub-block of the first pointer block has not been marked as being empty; in response to the determining that the second sub-block has not been marked as being empty, determining that the second sub-block does not contain any addresses of the file system at which storage space is allocated to the files of the applications; and deleting the first pointer block from the storage device.

18 Claims, 6 Drawing Sheets

(56) References Cited

U.S. PATENT DOCUMENTS

| | | | |
|---|---|---|---|
| 2008/0276036 A1* | 11/2008 | Van Acht | G06F 12/0246 711/E12.008 |
| 2010/0114909 A1* | 5/2010 | Museth | G06T 9/00 707/E17.051 |
| 2012/0296872 A1 | 11/2012 | Frost et al. | |
| 2018/0239546 A1* | 8/2018 | Baptist | G06F 3/0652 |
| 2018/0285375 A1 | 10/2018 | Desai et al. | |
| 2020/0192712 A1 | 6/2020 | Krishnamurthy et al. | |

* cited by examiner

OPTIMAL METHOD FOR DELETING SUB-BLOCKS OF A POINTER BLOCK THAT DO NOT HAVE ON-DISK METADATA HEADERS FOR ADDRESSES

CROSS-REFERENCE TO RELATED APPLICATIONS

This application is a continuation of U.S. patent application Ser. No. 17/399,098, filed Aug. 11, 2021, which is incorporated by reference herein, and for which benefit was claimed under 35 U.S.C. 119(a)-(d) to Foreign Application Serial No. 202141028254 filed in India entitled "OPTIMAL METHOD FOR DELETING SUB-BLOCKS OF A POINTER BLOCK THAT DO NOT HAVE ON-DISK METADATA HEADERS FOR ADDRESSES," on Jun. 23, 2021, by VMware, Inc., which is incorporated by reference herein for all purposes.

BACKGROUND

A storage device with a file system may apply may employ thin provisioning of its physical resources. Instead of statically allocating physical storage capacities to files of applications, such a storage device increases and decreases the storage capacities of files on demand, which helps to avoid wasted storage. A storage device that employs thin provisioning may support both write and unmap input/output operations (IOs). Applications may issue write IOs to write data to files of the storage device and unmap IOs to deallocate storage space from the files in units such as 1-MB data blocks. When the storage device deallocates data blocks, the storage device should also zero the data blocks by deleting previously stored information.

For applications to access data blocks, the file system may employ pointer blocks, which may be, e.g., 64-KB data objects within such 1-MB data blocks. Pointer blocks store addresses of data blocks, i.e., point to data blocks, that are allocated to files of the applications. However, for reasons such as increasing the storage capacity of each pointer block, such pointer blocks may not contain on-disk metadata headers for indicating when the pointer blocks become empty of any addresses.

When a pointer block becomes empty, the pointer block should be deleted from storage to free the unused storage space. However, without metadata headers, each time an address is deleted from a pointer block, the pointer block must be scanned to determine whether the pointer block has become empty. Such a scan involves checking each storage position of the pointer block or checking storage positions until finding a stored address. Scanning a pointer block each time an address is deleted is inefficient. For example, if only the last storage position of the pointer block contains an address, each storage position must be checked to determine that the pointer block is not empty. A method for efficiently deleting such pointer blocks that become empty is needed.

SUMMARY

Accordingly, one or more embodiments provide a method of deleting a first pointer block of a plurality of pointer blocks of a file system from a storage device used by a plurality of applications, wherein the plurality of pointer blocks are each subdivided into sub-blocks. The method includes the steps of: determining that a first sub-block of the first pointer block is marked as being empty of any addresses of the file system at which storage space is allocated to files of the applications; determining that a second sub-block of the first pointer block has not been marked as being empty; in response to the determining that the second sub-block has not been marked as being empty, determining that the second sub-block does not contain any addresses of the file system at which storage space is allocated to the applications; and in response to the determining that the first sub-block is marked as being empty and the determining that the second sub-block does not contain any addresses of the file system, deleting the first pointer block from the storage device.

Further embodiments include a non-transitory computer-readable storage medium comprising instructions that cause a computer system to carry out the above method, as well as a computer system configured to carry out the above method.

DETAILED DESCRIPTION

Figure 1:
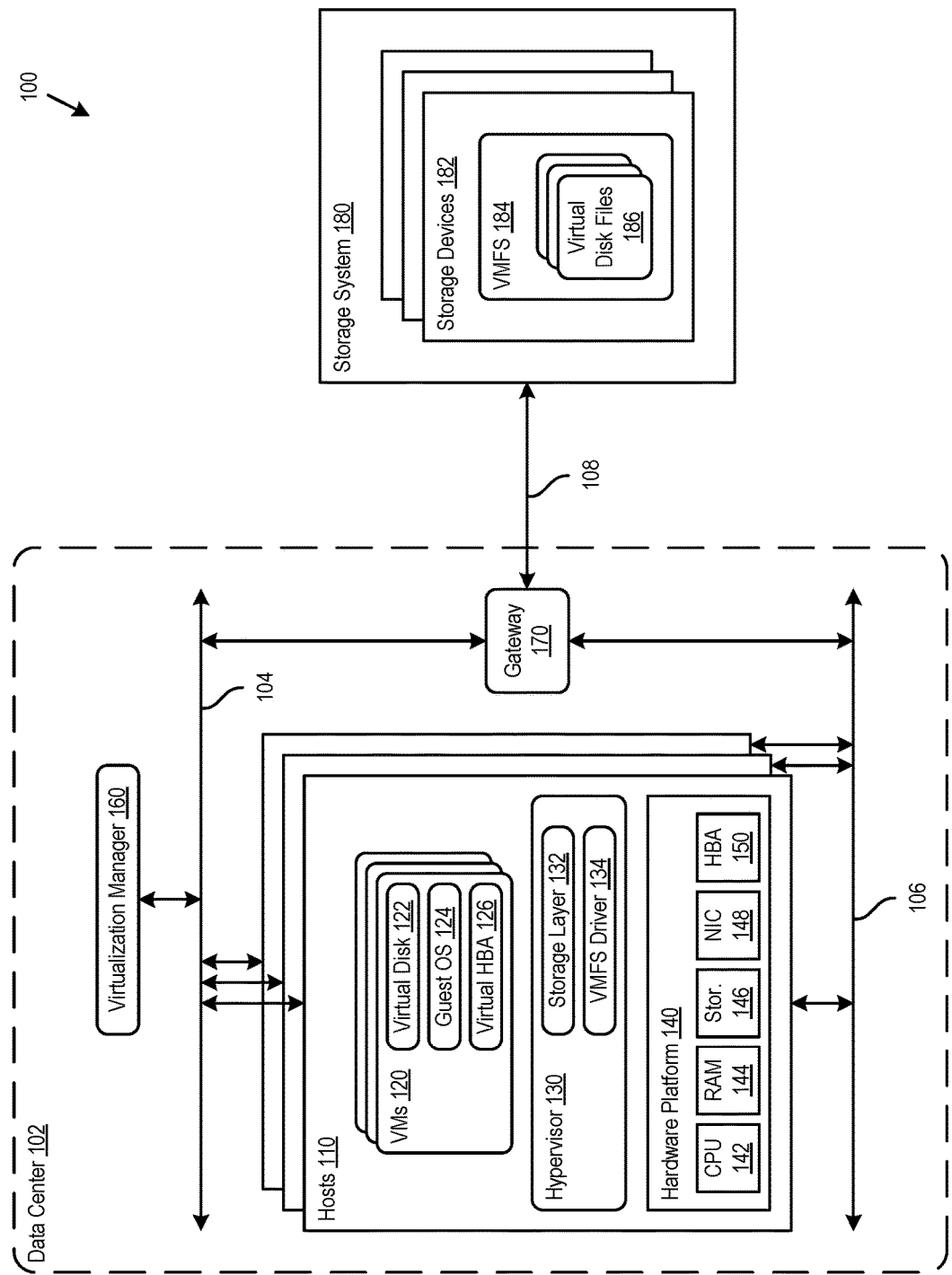
FIG. 1 is a block diagram of a virtualized computing system in which one or more embodiments of the present invention may be implemented.

FIG. 1 is a block diagram of a virtualized computing system 100 in which one or more embodiments of the present invention may be implemented. Virtualized computing system 100 comprises a data center 102 connected to a storage system 180 over a network 108. Network 108 may be, e.g., a local area network (LAN), wide area network (WAN), storage area network (SAN), or combination of networks. Although storage system 180 is depicted as being located outside of data center 102 and accessible via a gateway 170, storage system 180 may instead be located within data center 102 and accessible without gateway 170.

Data center 102 includes a cluster of hosts 110, virtualization manager 160, management network 104, and data network 106. Although management network 104 and data network 106 are depicted as separate physical LANs, management and data networks may instead be logically isolated from the same physical LAN using different virtual local area network (VLAN) identifiers.

Each host 110 may be constructed on a server grade hardware platform 140 such as an x86 hardware platform. For example, hosts 110 may be geographically co-located servers on the same rack. Hardware platform 140 of each host 110 includes a central processing unit (CPU) 142, system memory such as random-access memory (RAM) 144, storage 146, a network interface card (NIC) 148, and a host bust adapter (HBA) 150. CPU 142 executes instructions that perform one or more operations described herein and that may be stored in RAM 144 and storage 146. RAM 144 is where programs and data are stored that are being actively used by CPU 142. Storage 146 comprises one or more persistent storage devices such as hard disk drives (HDDs), solid-state drives (SSDs), and optical disks. NIC 148 enables a host 110 to communicate with other devices over management network 104 and data network 106. HBA 150 couples hosts 110 to storage system 180.

Each host 110 includes a hypervisor 130, which is a virtualization software layer that abstracts hardware resources of hardware platform 140 for concurrently running virtual machines (VMs) 120. Although the disclosure is described with reference to VMs, the teachings herein also apply to nonvirtualized applications and to other types of virtual computing instances such as containers, Docker containers, data compute nodes, isolated user space instances, and the like for which a storage device employs thin provisioning. One example of a hypervisor 130 that may be used is a VMware ESXi™ hypervisor from VMware, Inc.

Virtualization manager 160 communicates with hosts 110 via management network 104 to perform administrative tasks such as managing hosts 110, managing VMs 120, provisioning VMs 120, migrating VMs 120 from one host 110 to another, and load balancing between hosts 110. Virtualization manager 160 may be a computer program that resides and executes in a server or, in other embodiments, a VM executing in one of hosts 110. One example of a virtualization manager is the VMware vCenter Server™ from VMware, Inc.

Gateway 170 provides components in data center 102, including VMs 120, with connectivity to network 108. Gateway 170 manages external public IP addresses for VMs 120, routes traffic incoming to and outgoing from data center 102, and provides networking services such as firewalls, network translation (NAT), dynamic host configuration protocol (DHCP), and load balancing over management network 104 and data network 106. Gateway 170 may be a physical device, or, in other embodiments, a software module running within one of hosts 110. Gateway 170 may also include two separate gateways: one for management network 104 and another for data network 106.

Storage system 180 comprises a plurality of storage devices 182. A storage device 182 is a persistent storage device such as an HDD, SSD, flash memory module, or optical drive. Virtualized computing system 100 implements a virtual machine file system (VMFS) 184 on each storage device 182. VMFS 184 is implemented throughout virtualized computing system 100 and is controlled by instances of VMFS driver 134 in hypervisors 130. Although the disclosure is described with reference to a VMFS, the teachings herein also apply to thin provisioning of files of other file systems.

Each VM 120 includes a virtual disk 122, guest operating system (OS) 124, and virtual HBA 126. Each virtual disk 122, also referred to as a "volume" or "AppStack," is associated with a virtual disk file 186 in a storage device 182. A virtual disk 122 exposes a VM 120 to an abstraction of the associated physical storage device 182. From the perspective of a guest OS 124, calls by the guest OS 124 to storage system 180 appear to only be routed to virtual disk 122. However, such calls to virtual disk 122 pass through virtual HBA 126 to hypervisor 130, and hypervisor 130 translates the calls to virtual disk 122 into calls to virtual disk files 186. An HBA emulator (not shown) within hypervisor 130 enables the necessary data transfer and control operations, which hypervisor 130 passes to HBA 150 for transmission to storage system 180. Virtual disk 122 is thus merely a logical abstraction of a storage disk, a virtual disk file 186 storing actual data that is associated with virtual disk 122. Virtual disk files 186 may be stored, e.g., in logical volumes or logical unit numbers (LUNs) exposed by storage system 180. In embodiments described herein, virtual disk files 186 are thin-provisioned. As such, storage space in storage devices 182 are allocated to files of VMs 120 on demand.

Hypervisor 130 includes a storage layer 132 configured to manage storage space persistently for VMs 120. While storage layer 132 is depicted as part of a virtualized architecture, storage layer 132 may also be implemented as a filesystem driver of an OS that manages storage space persistently for locally attached storage. In one embodiment, storage layer 132 includes numerous logical layers, including an IO virtualization layer. The IO virtualization layer receives IOs intended for a virtual disk 122, e.g., write and unmap IOs. The IO virtualization layer converts the IOs into filesystem operations that are understood by a VMFS driver 134. The IO virtualization layer then issues the filesystem operations to VMFS driver 134 to access virtual disk files 186.

VMFS driver 134 manages the creation, use, and deletion of virtual disk files 186. VMFS driver 134 converts filesystem operations received from the IO virtualization layer of storage layer 132 to raw small computer system interface (SCSI) operations, which are issued to a data access layer (not shown). The data access layer applies command queuing and scheduling policies to the raw SCSI operations before sending the operations to hardware platform 140 to be further transmitted to storage system 180. The write and unmap IOs performed by storage devices 182 are thus SCSI write and unmap commands.

Figure 2:
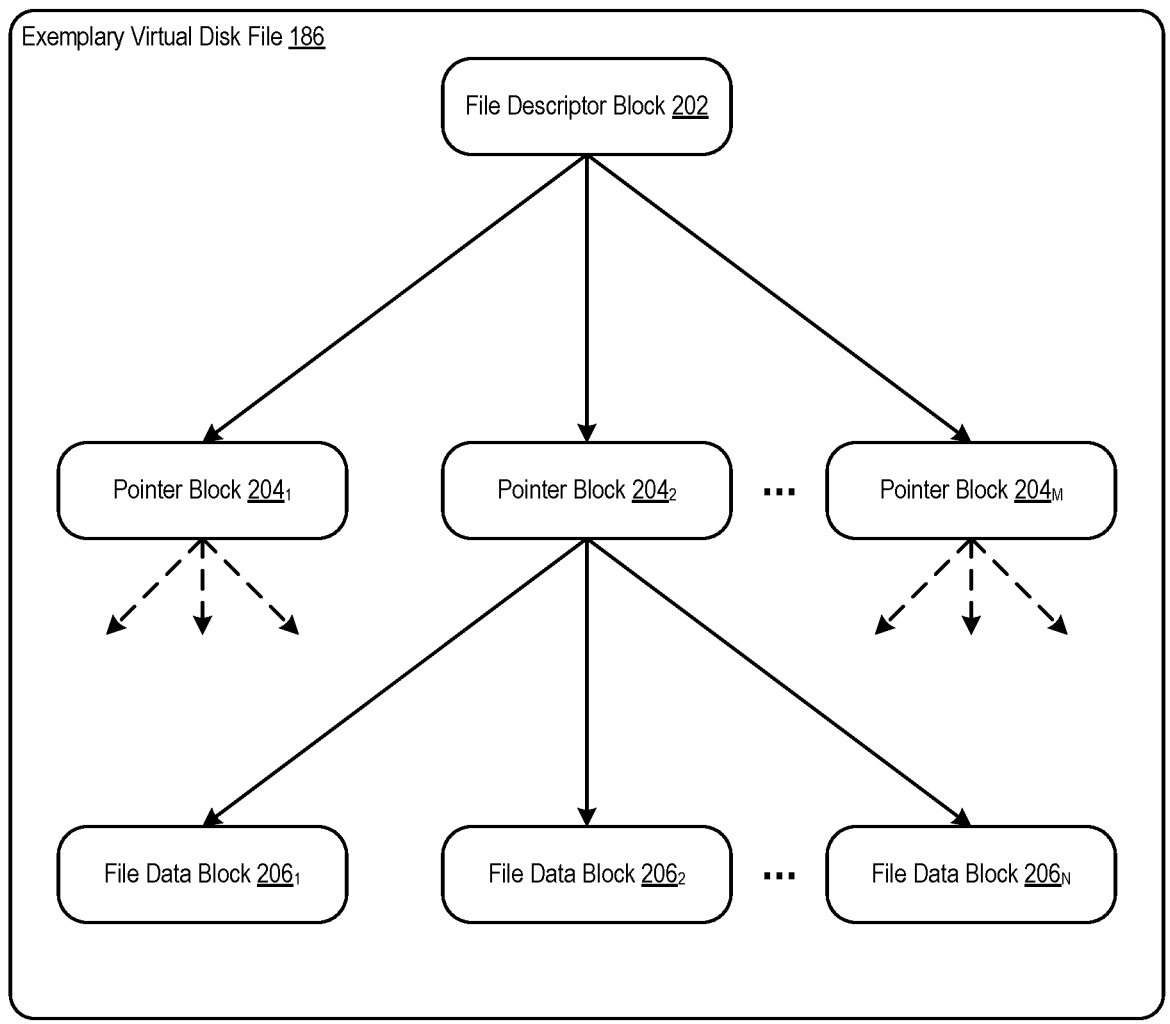
FIG. 2 is a block diagram of an exemplary virtual disk file of a virtual machine file system, according to an embodiment.

FIG. 2 is a block diagram of an exemplary virtual disk file 186 of VMFS 184, according to an embodiment. Virtual disk file 186 comprises a file descriptor block 202, pointer blocks 204, and file data blocks 206.

File descriptor block 202 may be, e.g., a data object within a 1-MB block of storage device 182. File descriptor block 202 is a root of virtual disk file 186, e.g., an inode. File descriptor block 202 stores metadata of virtual disk file 186 including, e.g., the sizes, ownerships, and types of a plurality of files of storage device 182. File descriptor block 202 also stores addresses of pointer blocks 204, i.e., points to pointer blocks 204. The addresses may be logical or physical addresses. A logical address is an address at which data appears to reside from the perspective of a guest OS 124 of a VM 120. A logical address is translated or mapped to a physical address of storage device 182.

A pointer block 204 may be, e.g., a data object within a 1-MB block of storage device 182. In FIG. 2, each pointer block 204 contains metadata of virtual disk file 186, including logical or physical addresses of a plurality of file data blocks 206. For example, pointer block $204_2$ points to file data blocks $206_1$, $206_2$, and $206_N$. Although FIG. 2 only shows a single layer of pointer blocks 204, virtual disk file 186 may contain several layers of pointer blocks 204. For example, virtual disk file 186 may contain two layers of pointer blocks 204, the pointer blocks 204 in a first layer pointing to the pointer blocks 204 in a second layer, and the pointer blocks 204 in the second layer pointing to file data blocks 206. Each pointer block 204 also includes metadata indicating whether file data blocks 206 pointed to by the pointer block 204 have been zeroed. As used herein, zeroing a file data block 206 involves storing zeros in each data storage position of the file data block 206. In an embodiment, zeroing of a file data block 206 is performed in response to an unmap IO. Additional metadata of pointer blocks 204 are discussed below in conjunction with FIG. 3.

File data blocks 206 contain data of virtual disk file 186 that VMs 120 utilize directly. A file data block 206 may be, e.g., a 1-MB block of storage device 182. Read and write IOs issued by VMs 120 to storage device 182 read data from and write data to file data blocks 206, respectively. File data blocks 206 that are pointed to by a pointer block 204 are "downstream" of that pointer block 204. For example, file data block $206_1$ is downstream of pointer block $204_2$, but not downstream of pointer block $204_1$.

Figure 3:
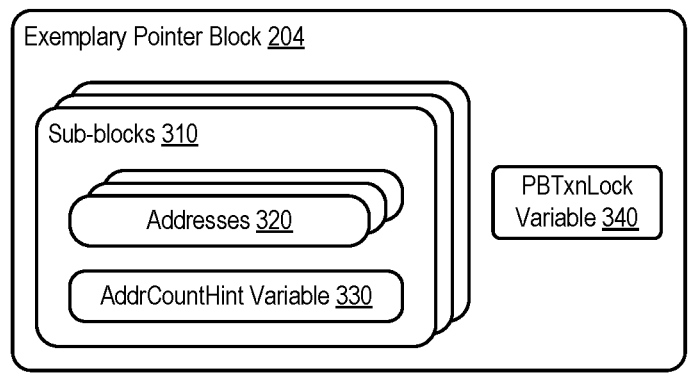
FIG. 3 is a block diagram of an exemplary pointer block of a virtual disk file, according to an embodiment.

FIG. 3 is a block diagram of an exemplary pointer block 204 of a virtual disk file 186, according to an embodiment. Pointer block 204 is subdivided into sub-blocks 310, each sub-block 310 comprising file data block addresses 320 of downstream file data blocks 206. Each sub-block 310 may contain, e.g., up to 512 addresses 320, each address 320 corresponding to a different file data block 206. Each sub-block 310 further comprises an "AddrCountHint" variable 330, and pointer block 204 further comprises a "PBTxnLock" variable 340.

AddrCountHint 330 is a variable that provides a hint as to how many addresses 320 are stored at a particular sub-block 310. In the embodiments described herein, AddrCountHint 330 may store either: (1) "0", (2) "unsigned −1", or (3) a positive value. When an AddrCountHint 330 is initialized for a given sub-block 310, the value of AddrCountHint 330 is initialized to "0". The value "0" indicates that it is unknown whether the sub-block 310 currently stores any addresses 320. If each storage position of a sub-block 310 is scanned, and it is determined that the sub-block 310 does not contain any addresses 320, AddrCountHint is updated to "unsigned −1". The special value "unsigned −1" indicates that the sub-block 310 is known to be empty. As addresses 320 are added to a sub-block 310 in response to write IOs and addresses 320 are deleted from a sub-block 310 in response to unmap IOs, AddrCountHint 330 is updated accordingly. Deleting an address 320 may be accomplished by setting each bit of the address at its storage position within the pointer block 204 to zero.

For example, if an address 320 is added to a sub-block 310 for which AddrCountHint 330 equals either "0" or "unsigned −1", AddrCountHint 330 may be updated to "+1" because it is known that there is at least one address 320 stored in the sub-block 310. Even if AddrCountHint 330 previously equaled "0", and it was thus unknown how many addresses 320 were stored, the sub-block 310 now contains at least the address 320 that was just added. Later, if another address 320 is added, AddrCountHint 330 may be updated from "+1" to "+2". Then, if an address 320 is deleted from the sub-block 310, AddrCountHint 330 may be updated from "+2" to "+1". At this point, it is known that the sub-block 310 still contains at least one address, so it is unnecessary to scan the storage positions of the sub-block 310 to determine emptiness. AddrCountHint 330 thus prevents an unnecessary scan. Later, if another address 320 is deleted, AddrCountHint 330 may be updated from "+1" to "0", and the sub-block 310 may be scanned. If the sub-block 310 is determined to be empty, AddrCountHint 330 may be updated from "0" to "unsigned −1". Otherwise, as soon as a valid address is found in the sub-block 310, the scanning may end. The AddrCountHint 330 may be updated from "0" to "+1" because it is known that there is at least one address 320 stored in the sub-block 310.

As long as the AddrCountHint 330 is set to "unsigned −1", a sub-block does not need to be scanned. For example, if a first sub-block 310 has an AddrCountHint 330 set to "unsigned −1", and a second sub-block 310 has an AddrCountHint 330 that is updated from "+1" to "0", the pointer block 204 may have become empty. As such, the pointer block 204 may need to be scanned to determine if each sub-block of the pointer block 204 is empty and the pointer block 204 may thus be deleted. Because the first sub-block 310 has an AddrCountHint 330 of "unsigned −1", it is unnecessary to scan the storage positions of the first sub-block 310. If each sub-block 310 either has an AddrCountHint 330 of "unsigned −1" or is determined to be empty based on a scan, the pointer block 204 may be deleted from its storage device 182 to free up storage.

PBTxnLock 340 is a variable that is set in response to a write IO, unmap IO, or scanning of a sub-block 310 to prevent any other transactions from updating AddrCountHints 330. For example, if an address 320 is added to a sub-block 310 in response to a write IO and the PBTxnLock 340 is set, an incoming unmap IO cannot update any AddrCountHints 330 until after the PBTxnLock 340 is unset.

Figure 4:
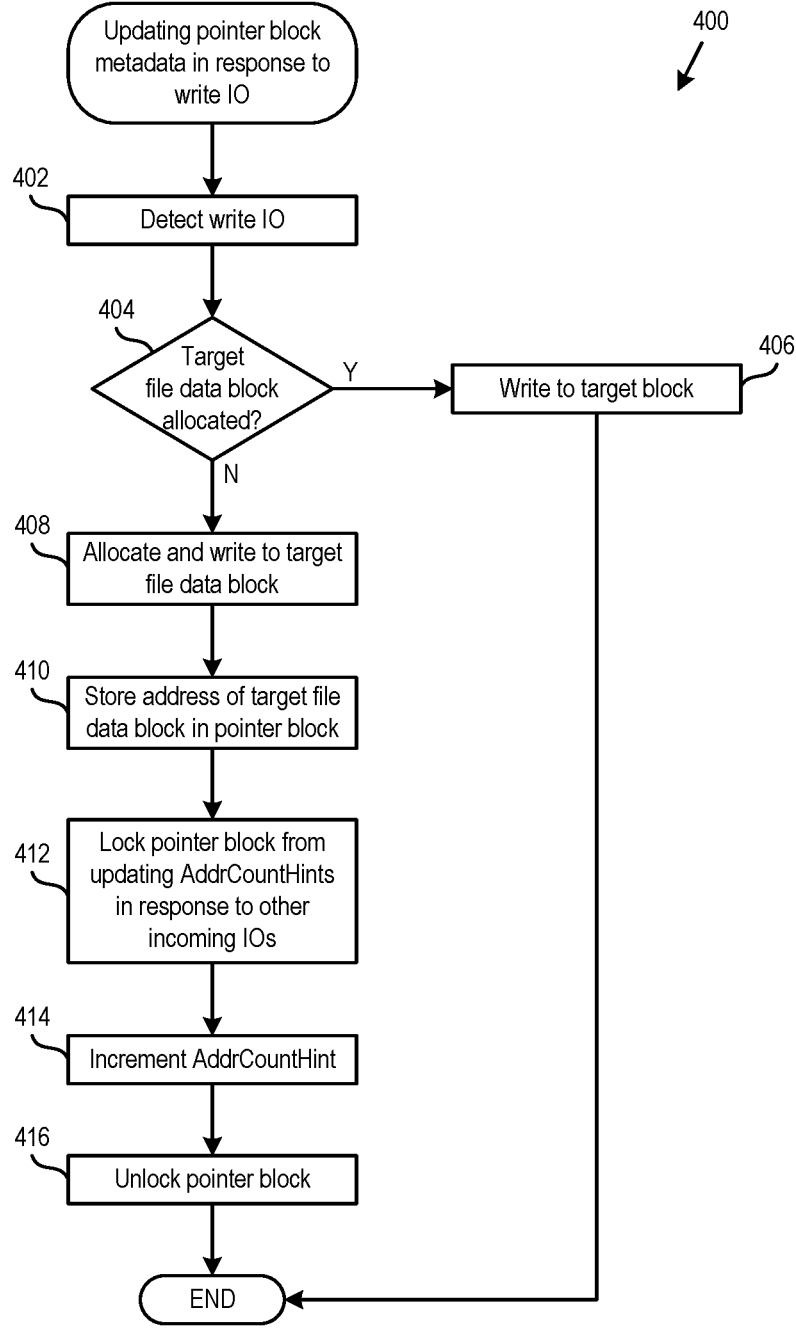
FIG. 4 is a flow diagram of steps carried out by a storage system to perform a method of updating pointer block metadata in response to a write IO, according to an embodiment.

FIG. 4 is a flow diagram of steps carried out by storage system 180 to perform a method 400 of updating pointer block metadata in response to a write IO, according to an embodiment. At step 402, a storage device 182 detects a write IO including an instruction to write data to a target file data block 206.

At step 404, the WAIFS 184 of the storage device 182 determines whether the target file data block 206 has already been allocated to a file of a VM 120. If the target file data block 206 has already been allocated, method 400 moves to step 406, and storage device 182 writes to the target file data block 206. After step 406, method 400 ends.

Otherwise, at step 404, if the target file data block 206 has not already been allocated to a file of a VM 120, method 400 moves to step 408. At step 408, VMFS 184 allocates the target file data block 206 to a file of the VM 120 from which the write IO originated, and storage device 182 writes the data of the write IO to the target file data block 206. At step 410, VMFS 184 stores the address 320 of the target file data block 206 in a sub-block 310 of a pointer block 204.

At step 412, VMFS 184 sets the PBTxnLock 340 of the pointer Ho& 204 to lock the pointer block 204 from updating any AddrCountHints 330 in response to other incoming IOs. At step 414, VMFS 184 increments the AddrCountHint 330 of the sub-block 310 to which the target address 320 was stored. At step 416, VMFS 184 unsets the PBTxnLock 340 to unlock the pointer block 204, After step 416, method 400 ends.

Figure 5:
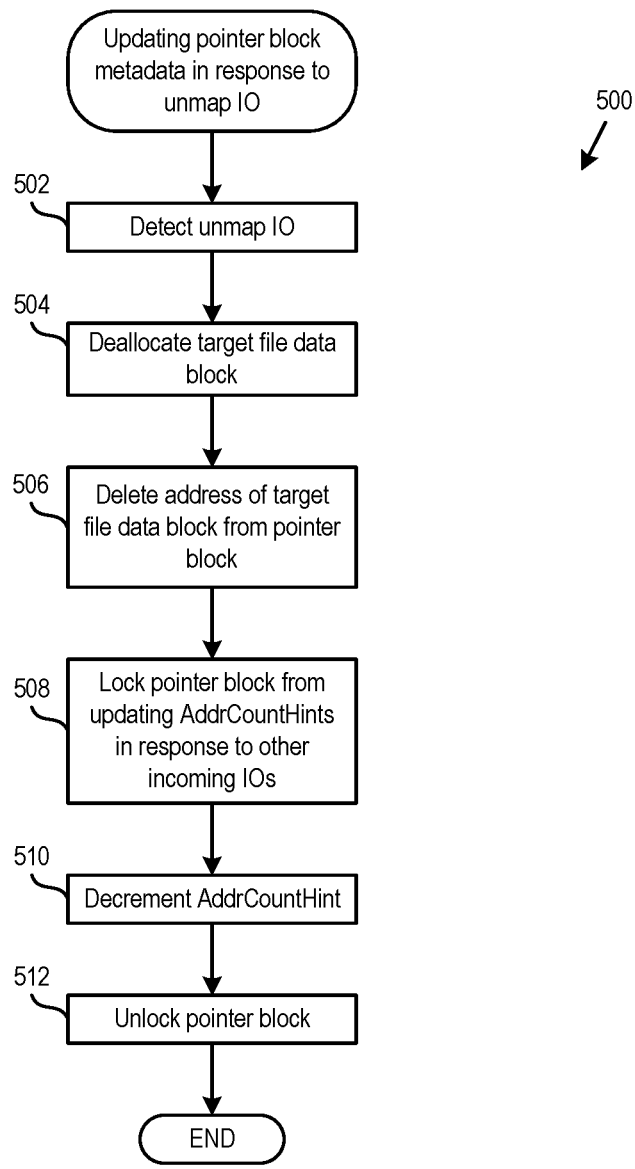
FIG. 5 is a flow diagram of steps carried out by a storage system to perform a method of updating pointer block metadata in response to an unmap IO, according to an embodiment.

FIG. 5 is a flow diagram of steps carried out by storage system 180 to perform a method 500 of updating pointer block metadata in response to an unmap IO, according to an embodiment. At step 502, a storage device 182 detects an unmap IO including an instruction to deallocate a target file data block 206 from a file of a VM 120.

At step 504, the VMFS 184 of the storage device 182 deal locates the target file data block 206 from the file of the VM 120. At step 506, VMFS 184 deletes the address 320 of the target file data block 206 from a sub-block 310 of a pointer block 204, At step 508, VMFS 184 sets the PBTxnLock 340 of the pointer block 204 to lock the pointer block 204 from updating any AddrCountHints 330 in response to other incoming IOs. At step 510, VMFS 184 decrements the AddrCountHint 330 of the sub-block 310 from which the address 320 was deleted. At step 512, VMFS 184 unsets the PBTxnLock 340 to unlock the pointer block 204. After step 512, method 500 ends.

Figure 6:
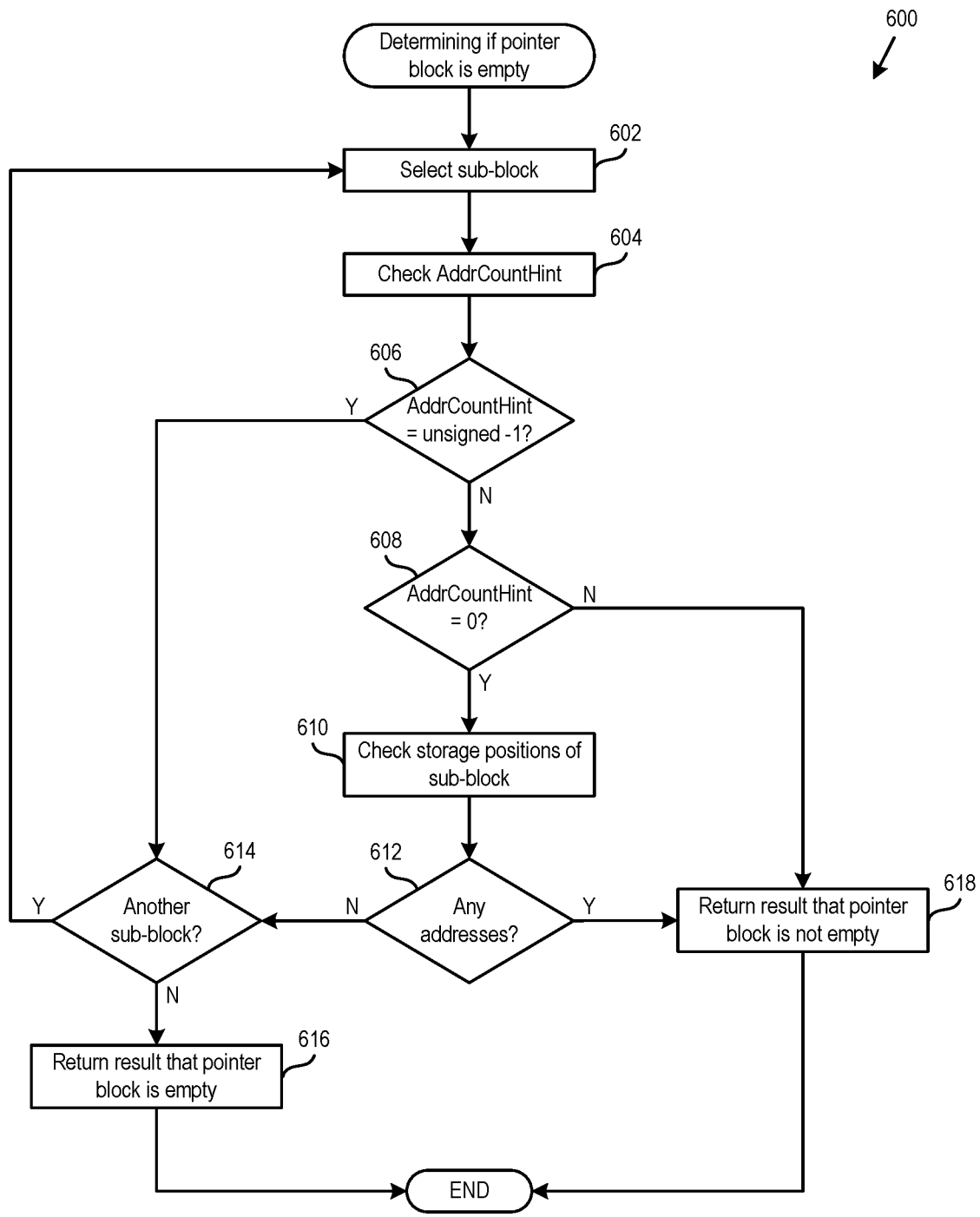
FIG. 6 is a flow diagram of steps carried out by a storage system to perform a method of determining if a pointer block is empty, according to an embodiment.

FIG. 6 is a flow diagram of steps carried out by storage system 180 to perform a method 600 of determining if a pointer block 204 is empty, according to an embodiment. At step 602, VMFS 184 selects a sub-block 310 of the pointer block 204. At step 604, VMFS 184 checks the AddrCountHint 330 of the selected sub-block 310.

At step 606, if the AddrCountHint 330 has a value of "unsigned −1", method 600 moves to step 614. Otherwise, if the AddrCountHint 330 does not have a value of "unsigned −1", method 600 moves to step 608. At step 608, if the AddrCountHint 330 does not have a value of "0", the AddrCountHint 330 must have a positive value, and method 600 moves to step 618. Otherwise, if the AddrCountHint 330 has a value of "0", it is currently unknown whether the selected sub-block 310 contains any addresses 320 of file data blocks 206, and method 600 moves to step 610.

At step 610, VMFS 184 checks the storage positions of the selected sub-block 310. At step 612, if it is determined that the selected sub-block 310 does not contain any addresses 320, method 600 moves to step 614, and VMFS 184 checks if there are any other sub-blocks 310 to check. At step 614, if there is another sub-block 310 to check, method 600 returns to step 602, and VMFS 184 selects another sub-block 310. Otherwise, if there is not another sub-block 310 to check, method 600 moves to step 616, and a result is returned indicating that the pointer Ho& 204 is empty. After step 616, method 600 ends.

At step 612, if it is determined that there is at least one address 320 in the selected sub-block 310, method 600 moves to step 618. At step 618, a result is returned indicating that the pointer block 204 is not empty. After step 618, method 600 ends.

Figure 7:
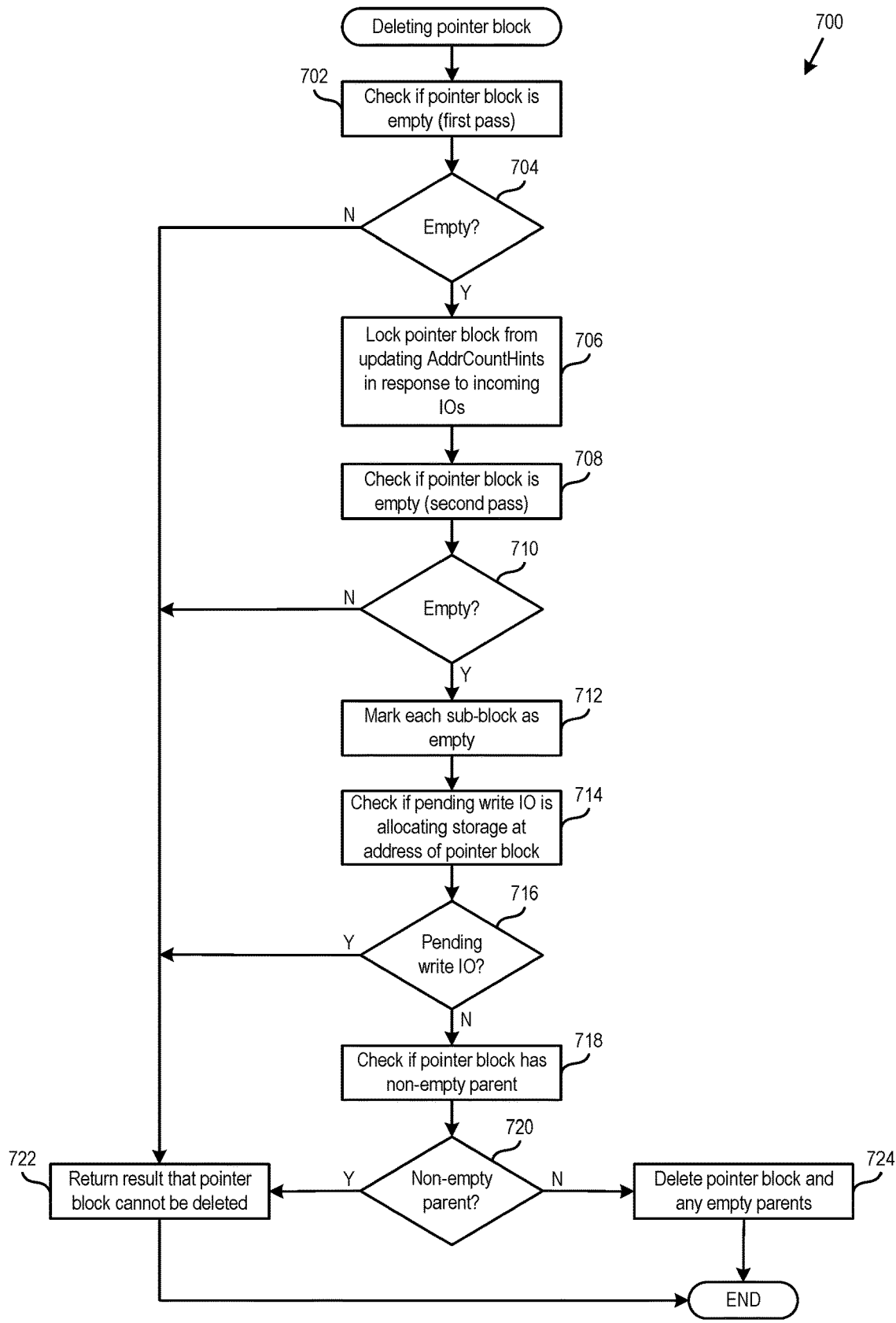
FIG. 7 is a flow diagram of steps carried out by a storage system to perform a method of deleting a pointer block, according to an embodiment.

FIG. 7 is a flow diagram of steps carried out by storage system 180 to perform a method 700 of deleting a pointer block 204, according to an embodiment. At step 702, VMFS 184 checks if the pointer block 204 is empty according to the method of FIG. 6. At step 704, if the pointer block 204 contains at least one address 320, method 700 moves to step 722. Otherwise, if the pointer block 204 is empty, method 700 moves to step 706.

At step 706, VMFS 184 sets the PBTxnLock 340 of the pointer block 204 to lock the pointer block 204 from updating any AddrCountHints 330 in response to incoming IOs. At step 708, VMFS 184 checks again if the pointer block 204 is empty according to the method of FIG. 6. For example, an address 320 may have been added to a sub-block 310 of the pointer block 204 while VMFS 184 was checking the pointer block 204 at step 702. At step 710, if the pointer block 204 contains at least one address 320, method 700 moves to step 722. Otherwise, if the pointer block 204 is still empty, method 700 moves to step 712.

At step 712, VMFS 184 sets the AddrCountHint 330 of each sub-block 310 to the value "unsigned −1" to mark each sub-block 310 as empty. At step 714, VMFS 184 checks if there are any pending write IOs allocating file data blocks 206 to files of VMs 120 at addresses 320 that will be added to the pointer block 204. At step 716, if there is such a pending write IO, method 700 moves to step 722. The pointer block 204 should not be deleted because the pending write IO would otherwise fail. Otherwise, if there are no such pending write IOs, method 700 moves to step 718.

At step 718, VMFS 184 checks if the pointer block 204 has any non-empty parent pointer blocks 204. Any parent pointer blocks 204 may be checked for emptiness, e.g., according to steps 702-710. At step 720, if the pointer block 204 contains at least one non-empty parent pointer block 204, method 700 moves to step 722. At step 722, a result is returned indicating that the pointer block 204 cannot be deleted. After step 722, method 700 ends.

Otherwise, at step 720, if the pointer block 204 either has no parent pointer Hocks 204 or each parent pointer block 204 is empty, method 700 moves to step 724. At step 724, the storage device 182 deletes the pointer block 204 along with any empty parent pointer blocks 204 to free storage space. After step 724, method 700 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, network-attached storage (NAS) systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of deleting pointer blocks from a file system of a storage device, wherein the pointer blocks are each subdivided into sub-blocks, the method comprising:
   checking a variable associated with a first sub-block of a first pointer block of the pointer blocks, wherein storage space has been allocated for the first sub-block to store a plurality of addresses of the file system, and the variable may be set to a first value to indicate that the first sub-block is empty of addresses of the file system;
   in response to determining that the variable is not currently set to the first value, checking the storage space that has been allocated for the first sub-block to determine that the first sub-block is actually empty of addresses of the file system; and
   in response to determining that each sub-block of the first pointer block, including the first sub-block, is empty, deleting the first pointer block from the file system.

2. The method of claim 1, wherein the file system is a virtual machine file system (VMFS), and the first pointer block is part of a virtual disk of the VMFS.

3. The method of claim 1, further comprising:
   before deleting the first pointer block, determining that each sub-block of a second pointer block is empty of addresses of the file system; and
   in response to determining that each sub-block of the second pointer block is empty, deleting the first and second pointer blocks from the file system.

4. The method of claim 1, further comprising:
   before checking the storage space that has been allocated for the first sub-block, locking the first pointer block to prevent the variable from being updated in response to incoming input/output operations (IOs).

5. The method of claim 1, further comprising:
   detecting a write input/output operation (IO) including an instruction to write data at an address of the file system; and
   in response to detecting the write IO, writing the data at the address, storing the address in the first sub-block, and incrementing the variable.

6. The method of claim 5, further comprising:
   after storing the address in the first sub-block, detecting an unmap IO including an instruction to deallocate storage space at the address; and
   in response to detecting the unmap IO: deallocating the storage space at the address, deleting the address from the first sub-block, and decrementing the variable.

7. A non-transitory computer-readable medium comprising instructions that are executable in a computer system, wherein the instructions when executed cause a storage device of the computer system to carry out a method of deleting pointer blocks from a file system of the storage device, and the pointer blocks are each subdivided into sub-blocks, the method comprising:
   checking a variable associated with a first sub-block of a first pointer block of the pointer blocks, wherein storage space has been allocated for the first sub-block to store a plurality of addresses of the file system, and the variable may be set to a first value to indicate that the first sub-block is empty of addresses of the file system;
   in response to determining that the variable is not currently set to the first value, checking the storage space that has been allocated for the first sub-block to determine that the first sub-block is actually empty of addresses of the file system; and
   in response to determining that each sub-block of the first pointer block, including the first sub-block, is empty, deleting the first pointer block from the file system.

8. The non-transitory computer-readable medium of claim 7, wherein the file system is a virtual machine file system (VMFS), and the first pointer block is part of a virtual disk of the VMFS.

9. The non-transitory computer-readable medium of claim 7, the method further comprising:
   before deleting the first pointer block, determining that each sub-block of a second pointer block is empty of addresses of the file system; and
   in response to determining that each sub-block of the second pointer block is empty, deleting the first and second pointer blocks from the file system.

10. The non-transitory computer-readable medium of claim 7, the method further comprising:
    before checking the storage space that has been allocated for the first sub-block, locking the first pointer block to prevent the variable from being updated in response to incoming input/output operations (IOs).

11. The non-transitory computer-readable medium of claim 7, the method further comprising:
    detecting a write input/output operation (IO) including an instruction to write data at an address of the file system; and
    in response to detecting the write IO, writing the data at the address, storing the address in the first sub-block, and incrementing the variable.

12. The non-transitory computer-readable medium of claim 11, the method further comprising:
    after storing the address in the first sub-block, detecting an unmap IO including an instruction to deallocate storage space at the address; and
    in response to detecting the unmap IO: deallocating the storage space at the address, deleting the address from the first sub-block, and decrementing the variable.

13. A storage device including a file system in which a plurality of pointer blocks are each subdivided into sub-blocks, wherein the storage device includes a file system module executing in the storage device, the file system module being configured to:
    check a variable associated with a first sub-block of a first pointer block of the pointer blocks, wherein storage space has been allocated for the first sub-block to store a plurality of addresses of the file system, and the variable may be set to a first value to indicate that the first sub-block is empty of addresses of the file system;

in response to determining that the variable is not currently set to the first value, check the storage space that has been allocated for the first sub-block to determine that the first sub-block is actually empty of addresses of the file system; and in response to determining that each sub-block of the first pointer block, including the first sub-block, is empty, delete the first pointer block from the file system.

14. The storage device of claim 13, wherein the file system is a virtual machine file system (VMFS), and the first pointer block is part of a virtual disk of the VMFS.

15. The storage device of claim 13; wherein the file system module is further configured to:

before deleting the first pointer block, determine that each sub-block of a second pointer block is empty of addresses of the file system; and in response to determining that each sub-block of the second pointer block is empty, delete the first and second pointer blocks from the file system.

16. The storage device of claim 13, wherein the file system module is further configured to:

before checking the storage space that has been allocated for the first sub-block, lock the first pointer block to prevent the variable from being updated in response to incoming input/output operations (IOs).

17. The storage device of claim 13, wherein the file system module is further configured to:

detect a write input/output operation (IO) including an instruction to write data at an address of the file system; and in response to detecting the write IO, write the data at the address, store the address in the first sub-block, and increment the variable.

18. The storage device of claim 17, wherein the file system module is further configured to:

after storing the address in the first sub-block, detect an unmap JO including an instruction to deallocate storage space at the address; and in response to detecting the unmap IO: deallocate the storage space at the address, delete the address from the first sub-block, and decrement the variable.

* * * * *